US012580966B2

(12) United States Patent

Sundararajan et al.

(10) Patent No.: US 12,580,966 B2
(45) Date of Patent: Mar. 17, 2026

(54) CLOUD WORKLOAD IMPORT INTO SD-WAN POLICY

(71) Applicant: Cisco Technology, Inc., San Jose, CA (US)

(72) Inventors: Balaji Sundararajan, Fremont, CA (US); Kannan Kumar, Tracy, CA (US); Madhu Somu, Fremont, CA (US); Ramakumara Kariyappa, San Jose, CA (US); Kushal A Patel, San Jose, CA (US); Vishnuprasad Raghavan, Sammamish, WA (US); Deepthi Tammireddy, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 175 days.

(21) Appl. No.: 18/356,937

(22) Filed: Jul. 21, 2023

(65) Prior Publication Data

US 2025/0030743 A1    Jan. 23, 2025

(51) Int. Cl.
*H04L 9/40* (2022.01)
*H04L 43/062* (2022.01)

(52) U.S. Cl.
CPC ............ *H04L 63/20* (2013.01); *H04L 43/062* (2013.01); *H04L 63/0236* (2013.01)

(58) Field of Classification Search
CPC .... H04L 63/20; H04L 43/062; H04L 63/0236
See application file for complete search history.

(56) References Cited

U.S. PATENT DOCUMENTS

| | | | |
|---|---|---|---|
| 11,652,872 B1 | 5/2023 | Parla et al. | |
| 2016/0344773 A1* | 11/2016 | Knjazihhin | ........... G06F 16/285 |
| 2020/0226271 A1 | 7/2020 | Sreedhar et al. | |
| 2020/0322262 A1* | 10/2020 | Maino | ...................... H04L 45/64 |
| 2021/0014119 A1* | 1/2021 | Seshadri | ............... H04L 63/102 |
| 2021/0409486 A1* | 12/2021 | Martinez | ............. H04L 67/1001 |
| 2022/0321533 A1* | 10/2022 | Zheng | ................... H04L 61/251 |
| 2023/0161895 A1 | 5/2023 | Carroll, Jr. et al. | |
| 2025/0112893 A1* | 4/2025 | Shah | ................... H04L 63/0236 |

* cited by examiner

*Primary Examiner* — Anh Nguyen
(74) *Attorney, Agent, or Firm* — Polsinelli P.C.

(57) ABSTRACT

Methods and systems are described herein for dynamically applying a security policy based on one or more tag attributes. The method comprises receiving, at a network controller, information about an instance of a cloud workload instantiated at a cloud provider. The cloud workload is associated with a tag attribute. The method further comprises querying the cloud provider for at least one IP address associated with the tag attribute and learning the at least one IP address associated with the tag attribute, including the IP address for the instance of the cloud workload. The method further comprises associating a security policy with the at least one IP address associated with the tag attribute and propagating the security policy to at least one edge router for implementation.

20 Claims, 4 Drawing Sheets

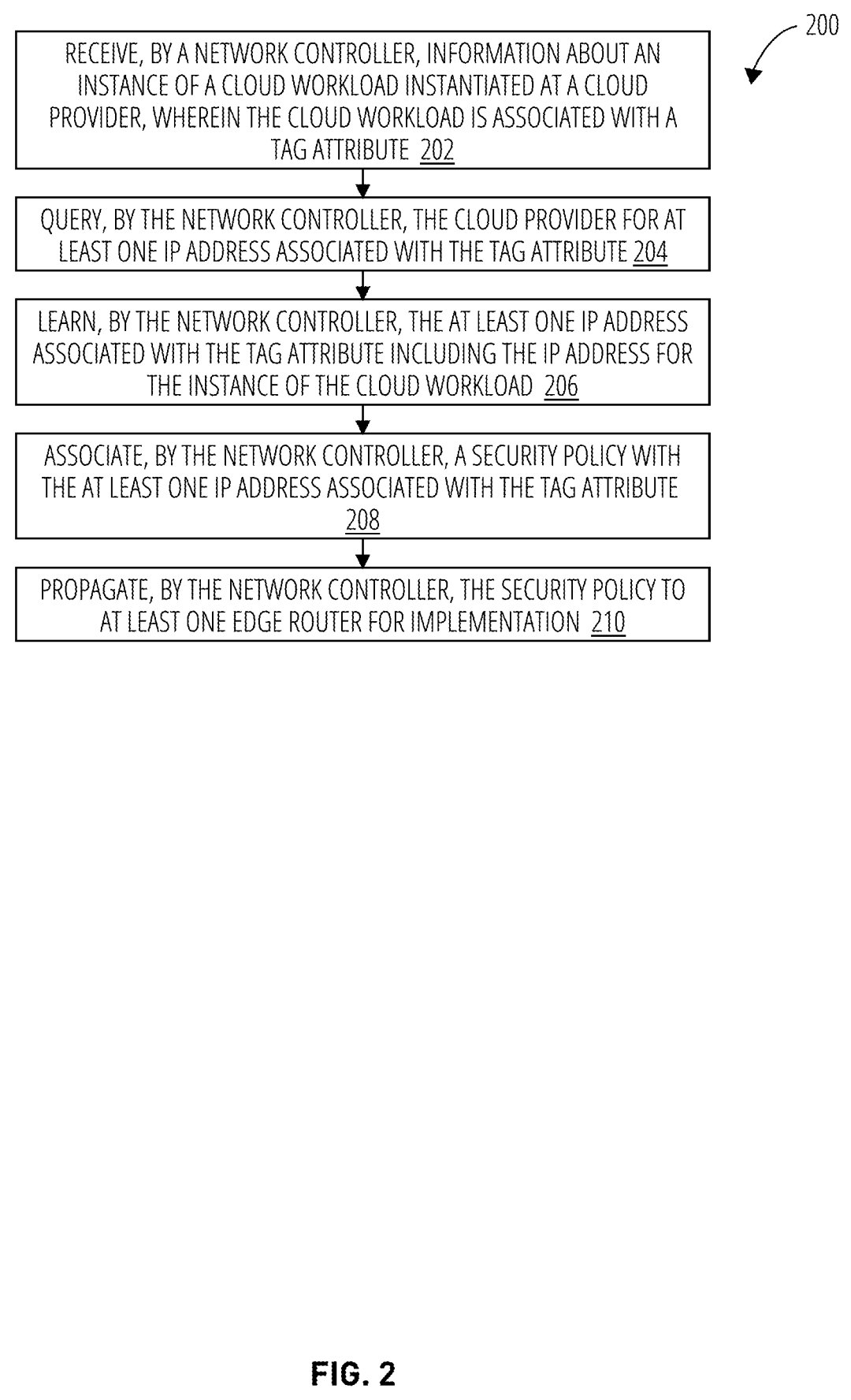

200

RECEIVE, BY A NETWORK CONTROLLER, INFORMATION ABOUT AN INSTANCE OF A CLOUD WORKLOAD INSTANTIATED AT A CLOUD PROVIDER, WHEREIN THE CLOUD WORKLOAD IS ASSOCIATED WITH A TAG ATTRIBUTE  202

QUERY, BY THE NETWORK CONTROLLER, THE CLOUD PROVIDER FOR AT LEAST ONE IP ADDRESS ASSOCIATED WITH THE TAG ATTRIBUTE 204

LEARN, BY THE NETWORK CONTROLLER, THE AT LEAST ONE IP ADDRESS ASSOCIATED WITH THE TAG ATTRIBUTE INCLUDING THE IP ADDRESS FOR THE INSTANCE OF THE CLOUD WORKLOAD  206

ASSOCIATE, BY THE NETWORK CONTROLLER, A SECURITY POLICY WITH THE AT LEAST ONE IP ADDRESS ASSOCIATED WITH THE TAG ATTRIBUTE 208

PROPAGATE, BY THE NETWORK CONTROLLER, THE SECURITY POLICY TO AT LEAST ONE EDGE ROUTER FOR IMPLEMENTATION  210

FIG. 2

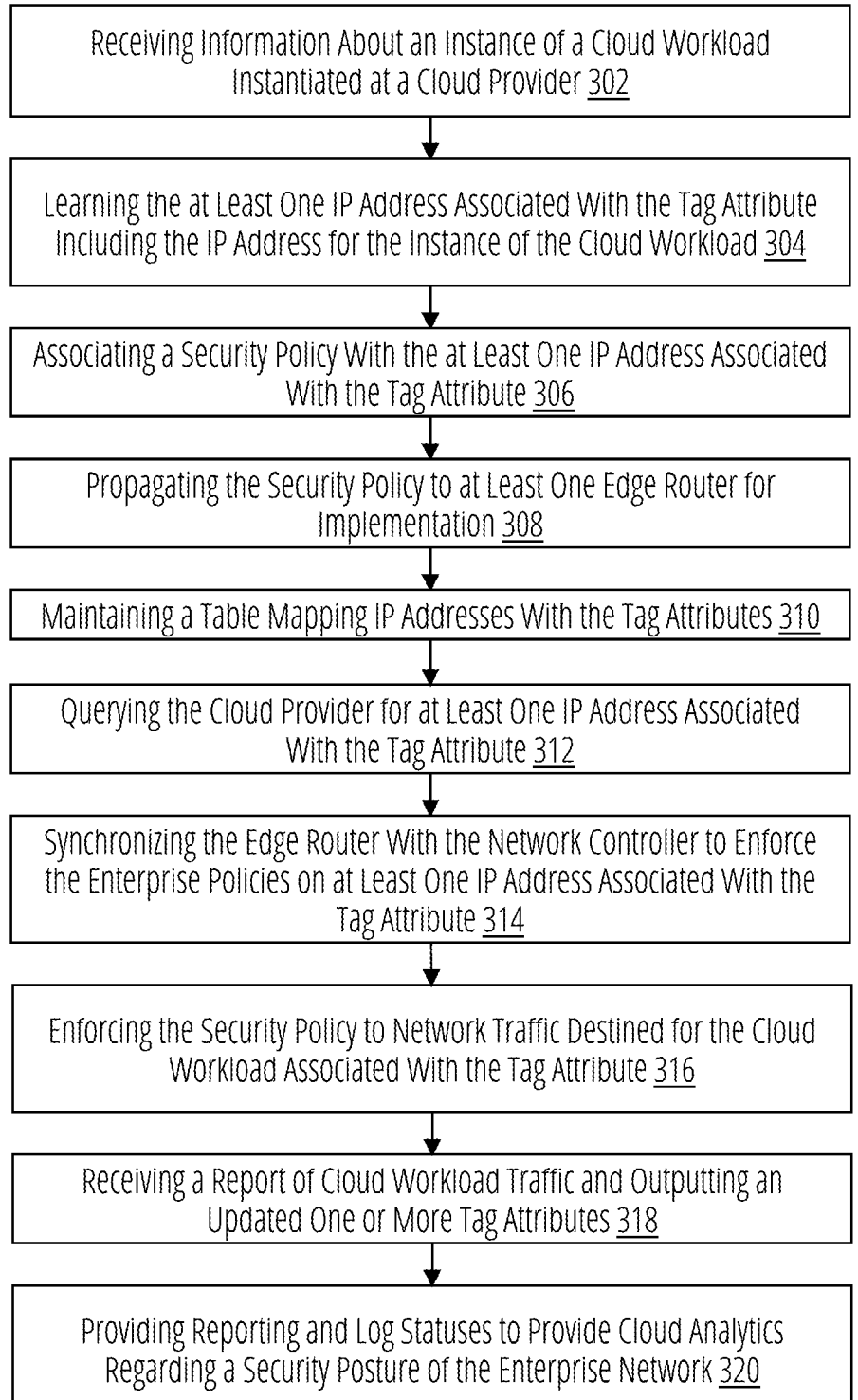

Receiving Information About an Instance of a Cloud Workload Instantiated at a Cloud Provider 302

Learning the at Least One IP Address Associated With the Tag Attribute Including the IP Address for the Instance of the Cloud Workload 304

Associating a Security Policy With the at Least One IP Address Associated With the Tag Attribute 306

Propagating the Security Policy to at Least One Edge Router for Implementation 308

Maintaining a Table Mapping IP Addresses With the Tag Attributes 310

Querying the Cloud Provider for at Least One IP Address Associated With the Tag Attribute 312

Synchronizing the Edge Router With the Network Controller to Enforce the Enterprise Policies on at Least One IP Address Associated With the Tag Attribute 314

Enforcing the Security Policy to Network Traffic Destined for the Cloud Workload Associated With the Tag Attribute 316

Receiving a Report of Cloud Workload Traffic and Outputting an Updated One or More Tag Attributes 318

Providing Reporting and Log Statuses to Provide Cloud Analytics Regarding a Security Posture of the Enterprise Network 320

FIG. 3

CLOUD WORKLOAD IMPORT INTO SD-WAN POLICY

TECHNICAL FIELD

This disclosure relates generally to associating cloud workloads with one or more tag attributes and applying security policies to the cloud workloads according to the one or more tag attributes.

BACKGROUND

A network security policy delineates guidelines for computer network access, determines policy enforcement, and lays out the architecture of an enterprise network security environment and defines how the security policies are implemented throughout the network architecture. There are various manners to apply particular security policies to particular network clients, including IP addresses/subnets, ports, protocols, FQDNs, geo-locations, user-identity and SGTs (Security Group Tags).

Specifically, cloud workload security is critical within an enterprise. A cloud workload refers to a collection of cloud-based resources and process an application, service, or capability requires to function. A cloud workload encompasses an application, its data, and the network resources that facilitate a connection between the application and a user. If any portion of the cloud workload malfunctions, then the application may be unable to function securely as intended. An ideal security policy applies specific security policies to granular instances of one or more cloud workloads.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2 illustrates an example flowchart for dynamically applying a security policy according to one or more tag attributes according to aspects of the present disclosure.

FIG. 3 illustrates an example flowchart for receiving a new cloud workload according to aspects of the present disclosure.

DETAILED DESCRIPTION

Figure 1:
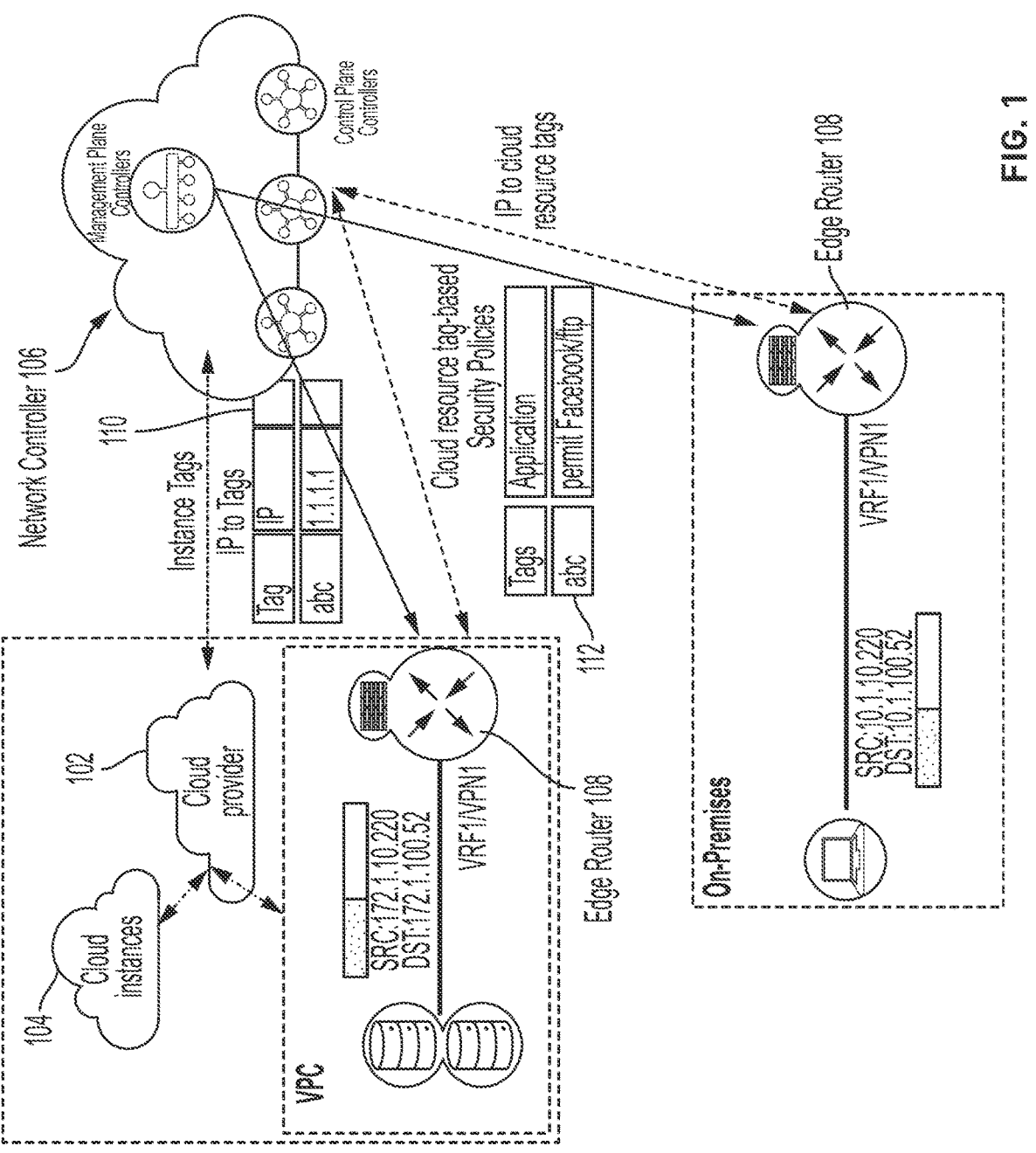
FIG. 1 illustrates a block diagram illustrating a system for dynamically applying security policies based on one or more tag attributes according to aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Methods and systems are described herein for dynamically applying a security policy based on one or more tag attributes. The method comprises: receiving, at a network controller, information about an instance of a cloud workload instantiated at a cloud provider. The cloud workload is associated with a tag attribute. The method further comprises querying the cloud provider for at least one IP address associated with the tag attribute and learning the at least one IP address associated with the tag attribute, including the IP address for the instance of the cloud workload. The method further comprises associating a security policy with the at least one IP address associated with the tag attribute and propagating the security policy to at least one edge router for implementation. The network controller is an SD-WAN controller including a management plane and a control plane. The tag attributes are highly customizable tags generated by a network administrator.

Propagating the security policy may include synchronizing the edge router with the network controller to update a policy table relating the security policy to at least one IP address associated with the tag attribute, whereby the edge router can implement the security policy for traffic associated with a destination IP address matching the at least one IP address associated with the tag attribute. In some instances, the security policy applies to traffic going from a branch of an enterprise network to the instance of the cloud workload in a public cloud. In some instances, the security policy applies to traffic coming from the instance of the cloud workload in a public cloud to a branch of the enterprise network.

The method may also comprise maintaining a table mapping IP addresses with the tag attributes. The IP addresses associated with the tag attributes can change as the instances of the cloud workload are instantiated and terminated. The method may further comprise enforcing the security policy to network traffic destined for the cloud workload associated with the tag attribute.

The method may further comprise adding a second IP address associated with the cloud workload to the table mapping IP addresses with the tag attributes as a second instance of the cloud workload is instantiated. The second IP address is associated with the security policy associated with the tag attribute. The method may further comprise assigning a tag attribute of the one or more tag attributes to the cloud workload if the cloud workload is not initially associated with one or more tag attributes. In some instances, the cloud workload is located at a public cloud and the network controller is part of an enterprise network.

In some instances, the instance of the cloud workload can be located in an enterprise cloud or a public cloud, and the instances of the cloud workload can be tagged as located in the enterprise cloud or the public cloud. The security policy of at least one IP address associated with the tag attribute can provide for differentiated treatment of the traffic depending on whether the instance of the cloud workload is located in the enterprise cloud or the public cloud.

The method may further comprise receiving a report of cloud workload traffic and outputting an updated one or more tag attributes. The method may further comprise providing reporting and log statuses to provide cloud analytics regarding a security posture of the enterprise network.

Other technical features may be readily apparent to one skilled in the art from the following figures, descriptions, and claims.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for a system for applying security policies to cloud workloads at a granular level according to customized user-generated tags. Security policies can be written using IP addresses/subnets, ports, protocols, FQDNs, geo-locations, user-identity, and SGTs (Security Group Tags). However, none of these techniques enable enterprises to define policies that can be enforced on cloud workloads as they are instantiated. Without the disclosed technology, enterprises are also unable to create microsegmentation within one or more cloud workloads, thus security policies are not as granular. This may generate more data loss/leak, imprecise security policies and/or measures, and less effective control over the workloads entering and/or exiting the network. Additionally, there may be latency in applying a security policy when a new cloud workload is instantiated.

When policies are applied for traffic to-and-from (or on) cloud providers, the present technology can improve the application of security policies by building an awareness of the metadata attached to the cloud resources (e.g., workloads, instances, network interfaces, etc.) into the SD-WAN policies. The metadata takes the form of tags (user-defined strings) which can then be derived by the SD-WAN controllers and distributed to edge routers. The tags are generated by a network administrator and are stored in a database where they are associated with one or more security policies, IP addresses, names, cloud providers, locations, etc. The tags can be customized according to the enterprise (e.g., "engineering," "userA," "corporationA," etc.). The tags are pushed to cloud providers and edge routers. Depending on where the edge router is deployed and the policies that are supposed to be enforced, the present technology builds a database/table on the edge router. When a new cloud workload is instantiated, a workload tag associated with the workload is recognized by the cloud provider. The router does a lookup of the IP address to see if this has been assigned to a tag and then classifies the new workload for policy enforcement. The IP address associated with the new workload is stored in the database and associated with the workload tag for future reference. The new workload is then classified for policy enforcement according to the security policy associated with the workload tag. Workload tag mapping may be used to generate data pertaining to the workloads entering and exiting the cloud providers (e.g., a report describing the nature of network traffic).

FIG. 1 illustrates a block diagram illustrating a system for dynamically applying security policies based on one or more tag attributes according to aspects of the present disclosure. In some examples, the network is managed by network controller 106. Network controller 106 may be a central controller for one or more networks, cloud providers, edge routers, and/or another device associated with an enterprise. Network controller 106 may be an SD-WAN controller including a management plane (e.g., vManage) and a control plane (e.g., vSmart). Network controller 106 may be operated by an administrator of the network associated with the enterprise. Network controller 106 may be located on-premises of the enterprise, or may be located off-premises of the enterprise. In some examples, more than one network controller may be incorporated into the system and method disclosed herein. The enterprise may be associated with one or more policies within the enterprise network, such as security policies, segmentation policies, microsegmentation policies, Internet policies, or any other network usage policy associated with the enterprise. For example, the enterprise policies may restrict access to one or more websites, may distinguish between one or more segments of the network, may limit the time duration of connectivity to the network, etc.

To aid in the enforcement of the policies, the administrator of the network and/or network controller 106 may generate one or more tag attributes. The tag attributes may be metadata containing custom descriptions tailored to the enterprise to assist in identifying instances of a cloud workload (e.g., "engineering," "userA," "corporationA," "guestUser," "remoteAccess," "IT," etc.) and may be associated with one or more policies. The administrator of the network may manually enter the tag attributes on a user interface associated with network controller 106 using a method of user input, such as keyboard entry, voice entry, etc. In some examples, network controller 106 may generate one or more recommended tag attributes. The recommended tag attributes may be presented to the administrator of the network via the user interface. The administrator of the network may select a recommended tag attribute of the one or more recommended tag attributes to be instantiated as a tag attribute. The one or more recommended tag attributes may be generated by default settings of network controller 106, may be generated using historical tag attributes associated with the enterprise network and/or network controller 106, may be generated by a machine-learning model trained to identify commonalities in cloud traffic, any combination thereof, or the like.

The tag attributes may be stored in policy table 112 in a location accessible by network controller 106. The location may be a database, cloud storage, local memory, etc. Policy table 112 may contain one or more tag attributes and the one or more tag attributes may be associated with one or more policies. For example, a tag attribute may be associated with a security policy and a segmentation policy. In some examples, the policies may be associated with more than one tag attribute. For example, the same security policy may apply to two instances of the cloud workload tagged with "engineering" and "accounting," respectively. In some examples, policy table 112 may include additional information, including notes associated with a tag attribute. The additional information may be input by the administrator of the network at the user interface associated with network controller 106. Policy table 112 may be pushed to one or more edge routers 108, which may enforce the enterprise policies outlined within policy table 112. Edge routers 108 may be located on-premises of the enterprise or may be located and/or associated with cloud provider 102 located off-premises.

Policy table 112 may be updated periodically by the administrator of the network. The administrator may update one or more policies within policy table 112, alter one or more tag attributes (e.g., changing a tag from "corporationA" to "BigCorp"), add one or more tag attributes, include additional data pertaining to a tag attribute (e.g., notes pertaining to the tag attribute, first and/or last names, departments, offices, type of device, etc.), any combination thereof, or the like. If policy table 112 is updated, network controller 106 may distribute the updated policy table 112 to one or more devices associated with the enterprise (e.g., edge router 108). In some examples, if an enterprise policy is changed (e.g., a change in segmentation policies for the enterprise network, a change in security policies for the enterprise network, etc.), the changed enterprise policy will be automatically updated throughout policy table 112. For example, if tag attribute "A" is associated with "security policy A" in the policy table, and "security policy A" is altered by the administrator of the network, "security policy A" associated with tag attribute "A" will be automatically updated in the policy table and will, therefore, be enforced accordingly.

In some examples, when a new instance of the cloud workload (e.g., instance of the cloud workload 104) is instantiated by cloud provider 102, cloud provider 102 may identify a tag attribute associated with the new instance. For example, the new instance may be associated with the tag attribute "userA." In some examples, cloud provider 102 may obtain the internet protocol (IP) address of a user device associated with the instance of the cloud workload 104. Cloud provider 102 may store the IP address of the user device in a table mapping IP addresses with the tag attribute 110. The IP address may be stored in association with the tag attribute. In some examples, more than one IP address may be stored in association with the tag attribute. For example, if two instances of a cloud workload are associated with two different IP addresses and are associated with the same tag attribute, then the two respective IP addresses may be stored in the table mapping IP addresses with the tag attribute. Table mapping IP addresses with the tag attribute 110 may be stored in a location accessible by cloud provider 102, such as a database, cloud storage, local memory, etc. Cloud provider 102 may verify that the IP address of the user device is a new IP address by cross-referencing the IP address of the user device with the one or more IP addresses stored in table mapping IP addresses with the tag attribute 110. In some examples, if the IP address has already been documented and associated with a tag attribute in table mapping IP addresses with the tag attribute 110, cloud provider 102 may not store the IP address in table mapping IP addresses with the tag attribute 110.

Cloud provider 102 may output the tag attribute to network controller 106. In some examples, cloud provider 102 may output the tag attribute and one or more IP addresses associated with the tag attribute. Network controller 106 may also receive table mapping IP addresses with the tag attribute 110. Network controller 106 may push the IP addresses associated with the tag attribute and/or table mapping IP addresses with the tag attribute 110 to edge router 108. Edge router 108 may classify instances of the cloud workload 104 by utilizing and referencing table mapping IP addresses with the tag attribute 110 and policy table 112. Edge router 108 may also apply enterprise policies, using the IP addresses associated with the tag attribute and/or table mapping IP addresses with the tag attribute 110, to the user devices associated with instances of the cloud workload 104. For example, edge router 108 may apply security policies, segmentation policies, microsegmentation policies, or any other enterprise policy to an instance of the cloud workload 104. A user device associated with the instance of the cloud workload 104 may gain access to the enterprise network, but within restrictions outlined by the administrator of the network within policy table 112.

Edge routers 108 may generate one or more reports and/or logs describing workloads received by the respective edge router. The reports and/or logs may include applicable tag attributes associated with the workloads. The reports and/or logs may permit administrators of the enterprise network of network controller 106 to obtain a detailed understanding of the overall cloud workload.

FIG. 2 illustrates an example routine 200 for dynamically applying an enterprise policy according to one or more tag attributes according to aspects of the present disclosure. Although the example routine 200 depicts a particular sequence of operations, the sequence may be altered without departing from the scope of the present disclosure. For example, some of the operations depicted may be performed in parallel or in a different sequence that does not materially affect the function of the routine 200. In other examples, different components of an example device or system that implements the routine 200 may perform functions at substantially the same time or in a specific sequence.

According to some examples, the method includes receiving, by a network controller, information about an instance of a cloud workload instantiated at a cloud provider, wherein the cloud workload is associated with a tag attribute at block 202. The network controller may be an SD-WAN controller including a management plane (e.g., vManage) and a control plane (e.g., vSmart). The instance of the cloud workload could be an attempt to access enterprise files, use an enterprise application, generate network analytics, any combination thereof, or the like. In some examples, when a new instance of the cloud workload is instantiated at a cloud provider, the cloud provider may detect one or more tag attributes associated with the new instance. Upon detecting a new instance of a cloud workload, the cloud provider may output an IP address and a tag attribute associated with the new instance of the cloud workload. The tag attribute may be a highly customizable tag generated by a network administrator of the network controller. The tag attributes may be altered, edited, added to, or deleted at any time by the network administrator. In some examples, the cloud provider (e.g., cloud provider 102 of FIG. 1) may maintain a table mapping IP addresses with the tag attributes.

The cloud provider may also detect an IP address associated with the new instance. Within the table mapping IP addresses with the tag attributes, the cloud provider may store one or more IP addresses in associated with a tag attribute. The table may be stored in a storage location accessible by the cloud provider. In some instances, the IP address may already exist within the table mapping IP addresses with the tag attributes or the IP address may not exist within the table mapping IP addresses with the tag attributes. For example, an employee of an enterprise may attempt to access a shared document from an enterprise-issued device, which would instantiate a new instance of the cloud workload at a cloud provider. The cloud provider may gather the IP address and the tag attribute of the enterprise-issued device, and query the table mapping IP addresses with the tag attributes to confirm that the IP address and the tag attribute are already stored in association. For example, the enterprise-issued device IP address may be associated with the tag attribute "accounting."

The IP addresses associated with a tag attribute can update as the instances of the cloud workload are instantiated and terminated. For example, the cloud provider may add a second IP address associated with the cloud workload to the table mapping IP addresses with the tag attributes as a second instance of the cloud workload is instantiated.

If a cloud workload is not associated with one or more tag attributes, the cloud provider may assign a tag attribute of the one or more tag attributes to the cloud workload. In some instances, the cloud provider may push the IP address of the cloud workload without a tag attribute to the network controller. The network controller may notify a network administrator, may assign a default tag associated with a default enterprise policy, may generate a custom tag associated with a default enterprise policy pertaining specifically to the cloud workload, any combination thereof, or the like.

In some instances, the cloud workload is located at a public cloud and the network controller is part of an enterprise network. In some instances, the instance of the cloud workload can be located in an enterprise (private) cloud or a public cloud, and the instance of the cloud workload can be tagged as located in the enterprise (private) cloud or the public cloud. Accordingly, a tag attribute may provide for differentiated treatment of the traffic depending on whether the instance of the cloud workload is located in the enterprise (private) cloud or the public cloud. For example, two substantially similar instances of a cloud workload, one located in the enterprise cloud and one located in the public cloud, might receive differentiated treatment according to enterprise policy.

According to some examples, the method includes querying, by the network controller, the cloud provider for at least one IP address associated with the tag attribute at block 204. In some examples, the cloud provider may provide the at least one IP address associated with the tag attribute via a table containing one or more IP addresses associated with one or more tag attributes. The IP address may be associated with a laptop computer, desktop computer, mobile phone, IoT device, sensor, tablet, any combination thereof, or the like. For example, the cloud provider may provide the IP address of an enterprise-issued device associated with an employee and an "accounting" tag attribute.

According to some examples, the method includes learning, by the network controller, the at least one IP address associated with the tag attribute including the IP address for the instance of the cloud workload at block 206. The network controller may receive the at least one IP address associated with the tag attribute from the cloud provider. In some examples, once the network controller learns the at least one IP address associated with the tag attribute, the network controller may output the at least one IP address associated with the tag attribute to one or more edge routers.

According to some examples, the method includes associating, by the network controller, a security policy with the at least one IP address associated with the tag attribute at block 208. A network administrator may associate an enterprise policy with a tag attribute. The enterprise policy may include one or more of a security policy, a segmentation policy, a microsegmentation policy, an Internet policy, any combination thereof, or the like. The network administrator may describe the association between one or more tag attributes and one or more enterprise policies in a table. For example, the enterprise may permit IP addresses associated with "accounting" to access one or more confidential financial documents, while the enterprise may not permit IP addresses associated with "marketing" to access the same financial documents. The variation in permissions and restrictions may be outlined within one or more enterprise policies within the table. One or more elements of the table and/or the entirety of the table may be pushed to one or more edge routers for policy enforcement. In some examples, the one or more edge routers may query the network controller for one or more elements of the table.

In some examples, the enterprise policies apply to traffic going from a branch of an enterprise network to the instance of the cloud workload in a public cloud. In some other examples, the enterprise policies may apply to traffic coming from the instance of the cloud workload in a public cloud to a branch of the enterprise network.

According to some examples, the method includes propagating, by the network controller, the security policy to at least one edge router for implementation at block 210. In some instances, the edge router and the network controller are synchronized to enforce an enterprise policy (e.g., a security policy) to at least one IP address associated with the tag attribute. This synchronization may occur in real time or periodically, depending on settings associated with the network controller. Synchronizing may include the edge router receiving updated tables, data describing at least one IP address associated with a tag attribute, and/or one or more enterprise policies associated with one or more tag attributes. The synchronization may comprise the network controller pushing data to the one or more edge routers, the one or more edge routers querying the network controller for data, or a combination of the two.

In some instances, this method further includes enforcing, by the at least one edge router, the security policy to network traffic destined for the cloud workload associated with the tag attribute. The edge router can implement the enterprise policy for traffic associated with a destination IP address matching the at least one IP address associated with the tag attribute. For example, the network controller may propagate the enterprise security policy associated with the "accounting" tag attribute to the edge router to apply appropriate restrictions to the enterprise-issued device of the employee.

The network controller may receive a report of cloud workload traffic. The report may include an updated one or more tag attributes, data pertaining to one or more cloud providers, routing information, network traffic data, data pertaining to one or more IP addresses, any combination thereof, or the like. The report may be customized according to settings associated with the network controller. In some instances, the network controller may provide reporting and log statuses to provide cloud analytics regarding a security posture of the enterprise network.

FIG. 3 illustrates an example flowchart for receiving a new cloud workload according to aspects of the present disclosure. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes receiving information about an instance of a cloud workload instantiated at a cloud provider at block 302. For example, the network controller 106 illustrated in FIG. 1 may receive information about an instance of a cloud workload (e.g., instance of the cloud workload 104 described in FIG. 1) instantiated at a cloud provider (e.g., cloud provider 102 described in FIG. 1). The network controller may be an SD-WAN controller including a management plane (e.g., vManage) and a control plane (e.g., vSmart).

The cloud workload may originate within the enterprise (e.g., from the premises of the enterprise) or may originate off-premises in a public datacenter and is connected to the enterprise network with a VPN. The cloud workload may be associated with a device, such as, but not limited to, a laptop computer, a desktop computer, a mobile device, a wireless printer, a sensor, any combination thereof, or the like.

According to some examples, the method includes learning the at least one IP address associated with the tag attribute including the IP address for the instance of the cloud workload at block 304. For example, the cloud provider 102 illustrated in FIG. 1 may learn the at least one IP address associated with the tag attribute including the IP address for the instance of the cloud workload (e.g., instance of the cloud workload 104 described in FIG. 1). The tag attribute may be metadata customized by a network administrator to categorize and/or classify the cloud workload (e.g., "engineering," "userA," "guestUser," "IT," etc.). The tag attributes may be highly customizable and used for generating customized network and/or cloud reports in addition to being used to associate policies to the workload based on the tag attributes. In some embodiments, when a cloud workload is not associated with one or more tag attributes, the method further comprises assigning a tag attribute of the one or more tag attributes to the cloud workload.

According to some examples, the method includes associating a security policy with the at least one IP address associated with the tag attribute at block 306. For example, the network controller 106 illustrated in FIG. 1 may associate a security policy with the at least one IP address associated with the tag attribute. A network administrator may generate a table that associates one or more policies with a tag attribute. The table may be stored in a location accessible to the network controller (e.g., policy table 112 described in FIG. 1). For example, the network administrator may include a "engineering" tag attribute within the table, and select particular security policies that may apply to IP addresses associated with "engineering." In another example, an instance of the cloud workload may be tagged with a tag attribute that indicates that the instance originated from the enterprise cloud or the public cloud. An instance of the cloud workload that originated from the enterprise cloud may be substantially similar to an instance of the cloud workload that originated from the public cloud, however the public cloud may be less secure that the enterprise cloud, thereby requiring different security policies. The policies included in the table may be security policies, segmentation policies, microsegmentation policies, or any other policy associated with the enterprise network.

In some examples, the network administrator may update the enterprise policies within the table. For example, the network administrator may update one or more enterprise policies associated with a tag attribute (e.g., adding an additional security restriction). Upon the network controller confirming the update, the update may now be in force throughout the entirety of the system in real time. For example, upon editing the enterprise policies associated with the tag attribute, the edge router may immediately begin implementing the updated enterprise policy.

According to some examples, the method includes propagating the security policy to at least one edge router for implementation at block 308. For example, the network controller 106 illustrated in FIG. 1 may propagate the security policy to at least one edge router (e.g., edge router 108 described in FIG. 1) for implementation. The network controller may push the first table to one or more edge routers to enforce the policies associated with the tag attributes. The edge router may receive workflows and classify the workflows using the configured tag-based policies.

According to some examples, the method includes maintaining a table mapping IP addresses with the tag attributes at block 310. For example, the cloud provider 102 illustrated in FIG. 1 may maintain a table mapping IP addresses with the tag attributes (i.e., a second table). When an instance of the cloud workload is detected at the cloud provider, the cloud provider may detect a tag attribute associated with the instance of the cloud workload. The cloud provider may reference the second table and output at least one IP address associated with the tag attribute to network controller 106, including the IP address associated with the instance of the cloud workload.

Within the second table, the IP addresses associated with the tag attributes can change as the instances of the cloud workload are instantiated and terminated. In some examples, the cloud provider may add a second IP address associated with the cloud workload to the table mapping IP addresses with the tag attributes as a second instance of the cloud workload is instantiated. When a new instance is detected, the cloud provider may obtain the IP address associated with the instance, verify the IP address is not stored in the second table, and store the IP address in association with the relevant tag attribute. If the IP address is stored in the second table, the cloud provider may not store the IP address. For example, if userA accesses the network via a personal device instead of a work device, the IP address of the personal device may be added to the second table.

According to some examples, the method includes querying the cloud provider for at least one IP address associated with the tag attribute at block 312. For example, the network controller 106 illustrated in FIG. 1 may query the cloud provider (e.g., cloud provider 102 described in FIG. 1) for at least one IP address associated with the tag attribute. In some examples, the network controller may query the cloud provider for all or portions of the second table.

According to some examples, the method includes synchronizing the edge router with the network controller to enforce the enterprise policies on at least one IP address associated with the tag attribute at block 314. For example, the network controller 106 illustrated in FIG. 1 may synchronize the edge router with the network controller to enforce the enterprise policies on at least one IP address associated with the tag attribute. The network controller may push the at least one IP address associated with the tag attribute, originally received from the cloud provider, to the edge router. In some examples, the edge router may query the network controller for the at least one IP address associated with the tag attribute. The synchronization (e.g., the push from the network controller and/or the query from the edge router) may occur periodically or in real-time. The edge router can implement the enterprise policies for traffic associated with a destination IP address matching the at least one IP address associated with the tag attribute. For example, the edge router may apply a security policy for userA's personal device.

According to some examples, the method includes enforcing the security policy to network traffic destined for the cloud workload associated with the tag attribute at block 316. For example, the edge router 108 illustrated in FIG. 1 may enforce the security policy to network traffic destined for the cloud workload associated with the tag attribute. The edge router may enforce the security policy to network traffic destined for the cloud workload located at a public or private cloud. In some examples, the enterprise policies apply to traffic going from a branch of an enterprise network to the instance of the cloud workload in a first cloud network. The enterprise policies may also apply to traffic going from a second cloud network to an instance of the cloud workload in a first cloud network. The enterprise policies may also apply to traffic coming from the instance of the cloud workload in a first cloud network to a branch of the enterprise network. For example, the edge router may enforce a security policy on userA's personal device while attempting to access the enterprise network from a public cloud.

According to some examples, the method includes receiving a report of cloud workload traffic and outputting an updated one or more tag attributes at block 318. For example, the network controller 106 illustrated in FIG. 1 may receive a report of cloud workload traffic and output an updated one or more tag attributes. The network controller may receive the report from one or more edge routers. The edge routers may detect one or more tag attributes over a routing period, which are outputted as the updated one or more tag attributes to the network controller. The reporting period may be set by the network administrator, default network settings, enterprise policies, any combination thereof, or the like. In some examples, the network controller may update the table described at block 306 to include the updated one or more tag attributes.

According to some examples, the method includes providing reporting and log statuses to provide cloud analytics regarding a security posture of the enterprise network at block 320. For example, the network controller 106 illustrated in FIG. 1 may provide reporting and log statuses to provide cloud analytics regarding a security posture of the enterprise network. Upon receipt of the report of cloud workload traffic from the edge router as described in block 318, the network controller may output a notification to the network administrator indicating that reporting and log statuses are ready for review. In some examples, the network administrator may customize the reporting and log statuses. For example, the network administrator may determine the frequency of the report (e.g., reporting period), tag attributes reported, duration of time, direction of traffic reported, IP addresses reported, time periods, inclusion of static workloads, any combination thereof, or the like.

Figure 4:
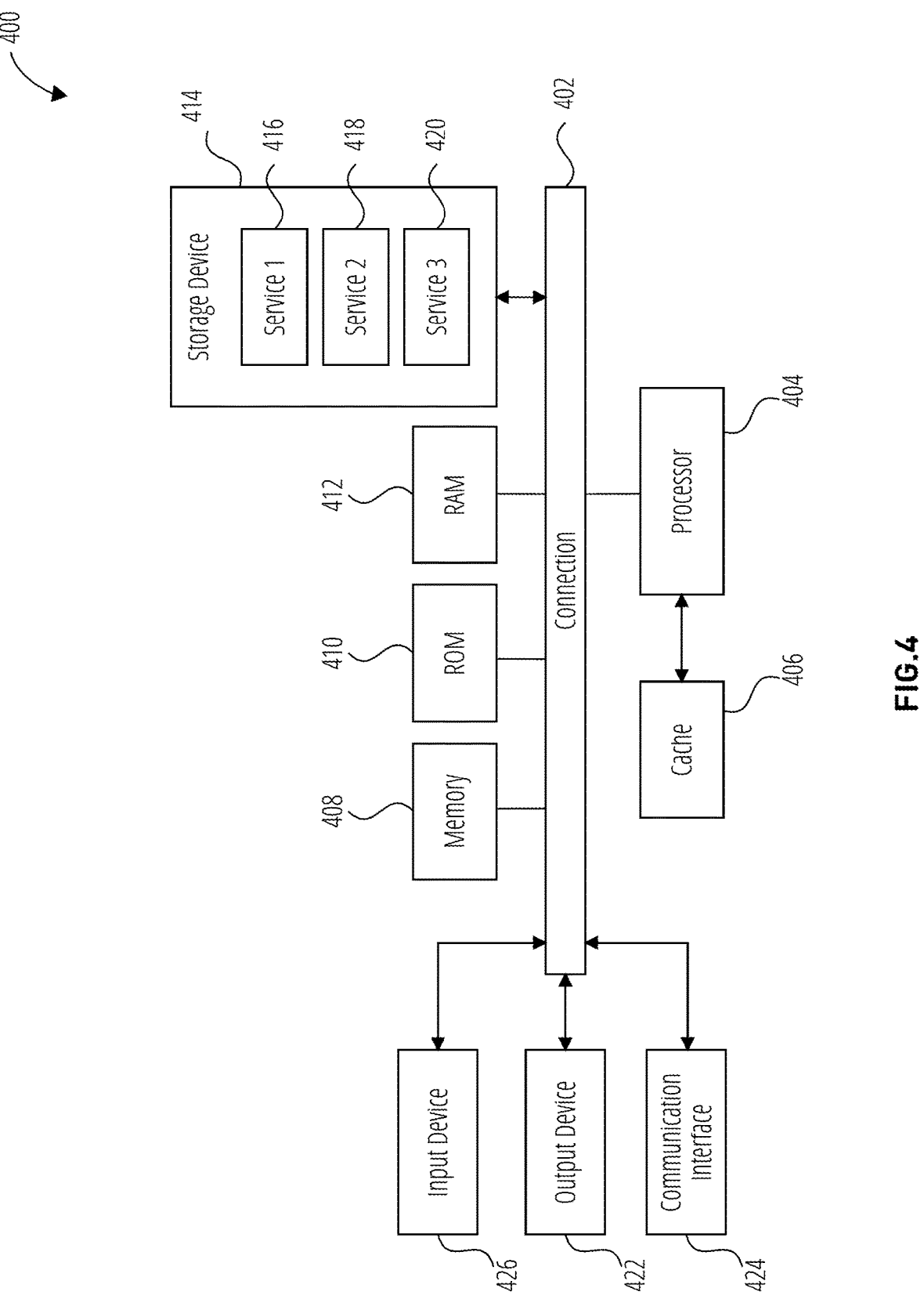
FIG. 4 shows an example of a computing system, which can be, for example any computing device that can implement components of the system according to aspects of the present disclosure.

FIG. 4 shows an example of a computing system, which can be, for example any computing device that can implement components of the system according to aspects of the present disclosure, or any component thereof in which the components of the system are in communication with each other using connection 402. Connection 402 can be a physical connection via a bus, or a direct connection into processor 404, such as in a chipset architecture. Connection 402 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 400 includes at least one processing unit (CPU or processor) 404 and connection 402 that couples various system components including system memory 408, such as read-only memory (ROM) 410 and random access memory (RAM) 412 to processor 404. Computing system 400 can include a cache of high-speed memory 406 connected directly with, in close proximity to, or integrated as part of processor 404.

Processor 404 can include any general purpose processor and a hardware service or software service, such as services 416, 418, and 420 stored in storage device 414, configured to control processor 404 as well as a special-purpose processor where software instructions are incorporated into the actual processor design. Processor 404 may essentially be a completely self-contained computing system, containing multiple cores or processors, a bus, memory controller, cache, etc. A multi-core processor may be symmetric or asymmetric.

To enable user interaction, computing system 400 includes an input device 426, which can represent any number of input mechanisms, such as a microphone for speech, a touch-sensitive screen for gesture or graphical input, keyboard, mouse, motion input, speech, etc. Computing system 400 can also include output device 422, which can be one or more of a number of output mechanisms known to those of skill in the art. In some instances, multimodal systems can enable a user to provide multiple types of input/output to communicate with computing system 400. Computing system 400 can include communication interface 424, which can generally govern and manage the user input and system output. There is no restriction on operating on any particular hardware arrangement, and therefore the basic features here may easily be substituted for improved hardware or firmware arrangements as they are developed.

Storage device 414 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 414 can include software services, servers, services, etc., that when the code that defines such software is executed by the processor 404, it causes the system to perform a function. In some embodiments, a hardware service that performs a particular function can include the software component stored in a computer-readable medium in connection with the necessary hardware components, such as processor 404, connection 402, output device 422, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A computer-implemented method of dynamically applying a policy based on tag attributes, comprising:
receiving, by a network controller, information about an instance of a cloud workload instantiated at a cloud provider, wherein the cloud workload is associated with a tag attribute, and wherein a pre-existing security policy prevents a device associated with the tag attribute from accessing the instance of the cloud workload;
in response to a need for the device to access the cloud workload, querying, by the network controller, the cloud provider for at least one IP address of the device associated with the tag attribute;
learning, by the network controller, the at least one IP address associated with the tag attribute;
associating, by the network controller, a modified security policy with the at least one IP address associated with the tag attribute;
propagating, by the network controller, the modified security policy to at least one edge router for implementation, wherein the modified security policy enables the device with the at least one IP address to access the instance of the cloud workload; and
receiving, by the network controller, a report and outputting an updated one or more tag attributes.

2. The computer-implemented method of claim 1, further comprising:
maintaining a table mapping IP addresses with the tag attributes.

3. The computer-implemented method of claim 1, further comprising:

enforcing, by the at least one edge router, the security policy to network traffic destined for the cloud workload associated with the tag attribute.

4. The computer-implemented method of claim 2, further comprising:
adding a second IP address associated with the cloud workload to the table mapping IP addresses with the tag attributes as a second instance of the cloud workload is instantiated, wherein the second IP address is associated with the security policy associated with the tag attribute.

5. The computer-implemented method of claim 1, wherein the propagating the security policy to the at least one edge router for implementation further comprises:
synchronizing the at least one edge router with the network controller to enforce the security policy on at least one IP address associated with the tag attribute, whereby the at least one edge router can implement the security policy for traffic associated with a destination IP address matching the at least one IP address associated with the tag attribute.

6. The computer-implemented method of claim 1, wherein the network controller is an SD-WAN controller including a management plane and a control plane.

7. The computer-implemented method of claim 1, wherein the tag attributes are highly customizable tags generated by a network administrator.

8. The computer-implemented method of claim 1, wherein the cloud workload is not associated with one or more tag attributes, the method further comprising:
assigning a tag attribute of the one or more tag attributes to the cloud workload.

9. The computer-implemented method of claim 1, wherein the cloud workload is located at a public cloud and the network controller is part of an enterprise network.

10. The computer-implemented method of claim 1, wherein the security policy applies to traffic going from a branch of an enterprise network to the instance of the cloud workload in a public cloud.

11. The computer-implemented method of claim 1, wherein the security policy applies to traffic going from a first cloud network to an instance of the cloud workload in a public cloud.

12. The computer-implemented method of claim 1, wherein the security policy applies to traffic coming from the instance of the cloud workload in a public cloud to a branch of an enterprise network.

13. The computer-implemented method of claim 1, wherein the instance of the cloud workload can be located in an enterprise cloud or a public cloud, and the instance of the cloud workload can be tagged as located in the enterprise cloud or the public cloud, wherein the security policy of the at least one IP address associated with the tag attribute provides for differentiated treatment of traffic depending on whether the instance of the cloud workload is located in the enterprise cloud or the public cloud.

14. The computer-implemented method of claim 1, wherein the report is of cloud workload traffic.

15. The computer-implemented method of claim 14, further comprising:
providing, by the network controller, reporting and log statuses to provide cloud analytics regarding a security posture of an enterprise network.

16. A computing apparatus comprising:
a processor; and
a memory storing instructions that, when executed by the processor, configure the apparatus to:

receive, by a network controller, information about an instance of a cloud workload instantiated at a cloud provider, wherein the cloud workload is associated with a tag attribute and wherein a pre-existing security policy prevents a device associated with the tag attribute from accessing the instance of the cloud workload;

in response to a need for the device to access the cloud workload, query, by the network controller, the cloud provider for at least one IP address of the device associated with the tag attribute;

learn, by the network controller, the at least one IP address associated with the tag attribute;

associate, by the network controller, a modified security policy with the at least one IP address associated with the tag attribute; and propagate, by the network controller, the modified security policy to at least one edge router for implementation, wherein the modified security policy enables the device with the at least one IP address to access the instance of the cloud workload.

17. The computing apparatus of claim 16, wherein the instructions further configure the apparatus to:

maintain a table mapping IP addresses with the tag attributes, wherein the IP addresses associated with the tag attributes can change as the instances of the cloud workload are instantiated and terminated.

18. The computing apparatus of claim 17, wherein the instructions further configure the apparatus to:

add a second IP address associated with the cloud workload to the table mapping IP addresses with the tag attributes as a second instance of the cloud workload is instantiated, wherein the second IP address is associated with the security policy associated with the tag attribute.

19. The computing apparatus of claim 16, wherein the instructions further configure the apparatus to:

enforce, by the at least one edge router, the security policy to network traffic destined for the cloud workload associated with the tag attribute.

20. A non-transitory computer-readable storage medium, the computer-readable storage medium including instructions that when executed by a computer, cause the computer to:

receive, by a network controller, information about an instance of a cloud workload instantiated at a cloud provider, wherein the cloud workload is associated with a tag attribute, and wherein a pre-existing security policy prevents a device associated with the tag attribute from accessing the instance of the cloud workload;

in response to a need for the device to access the cloud workload, query, by the network controller, the cloud provider for at least one IP address of the device associated with the tag attribute;

learn, by the network controller, the at least one IP address associated with the tag attribute;

associate, by the network controller, a modified security policy with the at least one IP address associated with the tag attribute;

propagate, by the network controller, the modified security policy to at least one edge router for implementation, wherein the modified security policy enables the device with the at least one IP address to access the instance of the cloud workload; and receive, by the network controller, a report and outputting an updated one or more tag attributes.

* * * * *